United States Patent [19]

Willard et al.

[11] Patent Number: 4,466,083
[45] Date of Patent: Aug. 14, 1984

[54] LOW FREQUENCY, BROADBAND, UNDERWATER SOUND TRANSDUCER

[75] Inventors: Bernard S. Willard, Ft. Lauderdale; Robert K. Judd, Dania, both of Fla.

[73] Assignee: The United States of America as represented by the Secretary of the Navy, Washington, D.C.

[21] Appl. No.: 499,720

[22] Filed: May 31, 1983

[51] Int. Cl.³ .............................................. H04R 11/00
[52] U.S. Cl. ...................................... 367/175; 367/182
[58] Field of Search ................................ 367/182–189, 367/175, 141

[56] References Cited

U.S. PATENT DOCUMENTS 2,557,080 6/1951 Dawson ............................... 367/182
2,591,795 4/1952 Eisler .................................... 367/185
2,745,085 5/1956 McCarty et al. .................... 367/185

Primary Examiner—Harold J. Tudor
Assistant Examiner—Tyrone Davis
Attorney, Agent, or Firm—Robert F. Beers; Arthur A. McGill; Prithvi C. Lall

[57] ABSTRACT

An electrodynamic transducer has broadband operation and is suitable for underwater use. The transducer has a flexible rubber seal to assist in keeping the unit watertight. New features include a large flared air passage, a coil of wire that is rectangular in cross section and is routed through the center of a hollow centering shaft. In addition, a piston is machined out of beryllium copper with the piston attached to the shaft at the dome center and the skirt spider center. The transducer is designed to operate with the magnet having its outer pole piece in contact with the seawater.

6 Claims, 1 Drawing Figure

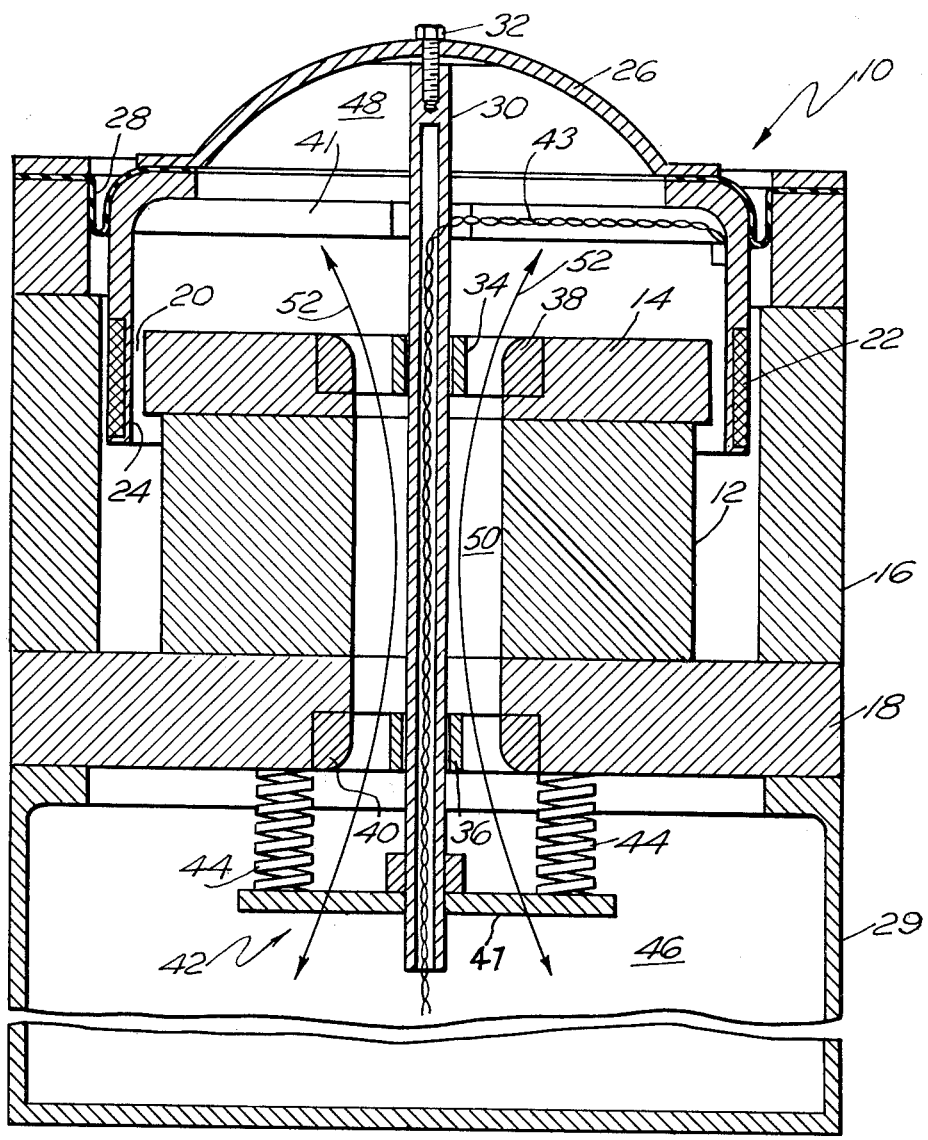

LOW FREQUENCY, BROADBAND, UNDERWATER SOUND TRANSDUCER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

There are four basic types of electroacoustic transducers in use for underwater sound transmission which will respond to an electrically programmable input signal. The first, is the piezoelectric transducer and the second is the magnetostrictive transducer. However, because of physical properties, these two are impractical to use at low frequencies. The third type is the hydraulic or hydro-acoustic transducer which is capable of low frequency, high power operation. This one is incapable of broadband operation.

The invention falls into the fourth category, electrodynamic or moving coil, piston type of transducer. This type of transducer is characterized by broadband operation, relatively small size, one moving part mechanism, low frequency capability and accurate reproduction of input signal. This type of transducer has been employed mainly as a laboratory or controlled environment calibration device because of its ability to accurately reproduce an input signal. The use of the device as an ocean going sound source has been somewhat limited because of several disadvantages.

(2) Description of the Prior Art

Moving coil, piston transducers rely upon a gas filled chamber which gives compliance to the piston motion. To operate at varying depths it is necessary to pressurize the gas to the external hydrostatic pressure. The change in gas pressure is accomplished by the use of one of several devices designed for that purpose. One disadvantage is the change in performance characteristics with pressure. The change is brought about by the variation of gas density with pressure and associated changes in viscosity and compliance. It is explained below that several facets of the invention minimize the undesirable effects.

The other disadvantage is the demonstrated low reliability of moving coil transducers. There are several areas of transducer operation which have historically been responsible for the high failure rate. These include: pressure compensation system flow rate inadequacy, coil overheating, leadwire fatigue, piston misalignment, shock due to piston hitting displacement stops, coil wire/coil form separation, seal failure and high voltage connector breakdown. The description below will significantly how several facets of the invention will significantly reduce the failure rate in these particular areas resulting in reliability factor equal to or better than that of alternative devices.

SUMMARY OF THE INVENTION

This electrodynamic transducer performs the underwater transmission of single or multiple frequency and/or broadband acoustic energy which is proportional to and generated by electrical power input. The transducer has many features to optimize its use under water for the above purposes. It can be made with a sound pressure level capability in the order of 182 dB//micropascal at a distance of one meter with an operating frequency range of approximately 10 to 1,000 Hz. Compared to alternate devices it is relatively small and lightweight. It has applications as a calibration device, acoustic target, communications device, acoustic countermeasure or any application requiring low frequency, broadband and/or high level underwater acoustic energy.

BRIEF DESCRIPTION OF THE DRAWING

The FIGURE is a cross-sectional view of an underwater transducer in accordance with the present invention.

DESCRIPTION OF THE PREFERRED EMBODIMENT

Referring now to the FIGURE there is shown a moving-coil or electrodynamic transducer 10. The transducer 10 can be towed under water when affixed to a suitable towbody.

The principle of operation in a moving coil transducer such as transducer 10 is the fact that force is exerted on a time variant current carrying conductor located in a steady-state magnetic field. The force is proportional to the change in current, the length of the conductor, and the density of the magnetic field.

In the transducer 10 the magnetic field is produced by a permanent magnet 12. The magnetic circuit is completed by magnetic conducting pieces 14, 16, 18 and a magnetic air gap 20. A current carrying conductor coil 22 located in gap 20 is wrapped around a beryllium copper piston skirt 24. Coil 22 is made of wire that is rectangular in cross section, is double layered and is oriented with the long dimension perpendicular to motion but in line with the radial heat flow. This piston skirt 24 is attached to a beryllium copper piston dome 26; the outside surface of which is in direct contact with the seawater. A flexible rubber seal 28 prevents water from entering the interior of transducer 10. The outer portion of seal 28 is connected to an extension of pole piece 16 and the inner portion of seal 28 is connected between piston dome 26 and piston skirt 24. A hollow centering shaft 30 is connected to dome 26 by means of screw 32. The entire piston assembly is made up of the skirt 24, the dome 26, centering shaft 30 and connecting components. The shaft 30 keeps the coil 22 centered in the magnetic gap 20 and restricts its motion to a straight line that is axial to the magnet 12 and the piston 26 by virtue of linear bearings 34 and 36 which are attached to the magnetic circuit by respective bearing holders 38 and 40. The current carrying conductor coil 22 is further centered in the magnetic gap 20 by the spring assembly 42 which attaches the end of shaft 30 to the magnetic circuit and by the beryllium copper skirt spider 41 located between shaft 30 and piston skirt 24. Electric current is fed to the coil via leadwires 43 which connect to an electric power source through any known watertight seal (not shown) in housing 29. The lead wires 43 after passing through the hollow of shaft 30 pass through an aperture shaft 30 and are taped to skirt spider 41. The piston suspension system is comprised of the springs 44 and the air mass contained in air chamber 46. The springs 44 are connected to shaft 30 by means of platform 47. Air is allowed to flow between the void 48 behind the piston dome 26 and the air chamber 46 via the air passage 50. The flow of air is generally shown by arrows 52. The size of the springs 44 and size of the air chamber 46 are calculated to give the transducer 10 a specified resonant frequency. The operating frequency range is determined by the resonant frequency on the low end and by the frequency at which the dome breaks up (distorts) at the high end.

There has been described a transducer 10 that gives better performance than previous moving coil transducer designs. The use of a large flared air passage 50 greatly reduces the amount of viscous damping due to oscillatory air flow between the void 48 behind the piston 26 and the air chamber 46. Previous designs normally used small holes with sharp edges which restrict air flow that in turn restrict piston motion.

Previous coil designs normally used multiple layers of standard round cross-section wire. There are several advantages of the two layer rectangular cross-section coil 22 in the present design. The use of only two layers of wire greatly reduces the impedance of the coil 22, making the transducer 10 a high-current low-voltage device. The use of high voltages in a seawater environment is undesirable because of the need for thick electrical insulation to prevent arcing and leakage paths.

The use of rectangular cross-section wire increases the copper density of the coil, allowing higher currents to flow for a given operating temperature. This, in turn, produces more output power before the temperature limit of the coil is reached. The placement of the rectangular wire in line with the radial heat flow provides better heat conduction to the dissipation surfaces, inside and outside of the coil 22.

The piston dome 26 is machined out of beryllium copper. This material was chosen because of its thermal coefficient of expansion. Previous designs usually employed aluminum pistons which have a higher coefficient causing two problems at high heat levels. The piston skirt would expand increasing its diameter until it touched the magnet, causing rubbing and eventual failure. The other effect was that of stretching the copper wire which had a lower coefficient, causing bonding failure upon cool down. The thermal coefficient of expansion of beryllium copper is almost identical to that of copper wire.

The piston dome 26 is attached to the shaft 30 at two points, at the dome 26 center and at the skirt spider 41 center. The skirt spider 41 has its outer periphery affixed to the outer periphery of piston dome 26 by means of piston skirt 24 and seal 28. This two-point attachment reduces any piston skew which would tilt the piston 26 with respect to the shaft 30. This has been identified as a major cause of failure in previous designs that have a single point attachment. The two-point attachment provides a moment arm which relies upon shaft 30 stiffness rather than the piston dome 26 face stiffness for skew prevention.

Another feature is the routing of coil leadwires through the center of the hollow centering shaft 30. Previous designs use flexible conductors which are attached to the piston at the top of the skirt 24 and to the magnet in close proximity. The routing of leads through the center of magnet 12 allows strain relief and vibration isolation in an area where long connecting leads may be employed to reduce fatigue and failure. Short connecting leads have also constituted a major cause of failure in the past.

This transducer 10 is designed to operate with the magnetic circuit in contact with the surrounding seawater. One of the failures which limits the amount of power that can be delivered to this type of transducer is the amount of heat that can be dissipated by the coil. The heat dissipation path is from the copper wire to the bonding material, to the air inside the magnet, to the magnet material and to the seawater via any media between the magnet and the water. All previous designs have the magnet encased in a chamber which is air-filled. This air becomes the conduction media between the magnet and case which is the final conduction media to the water. The placement of the magnetic circuit in direct contact with the water greatly enhances heat dissipation and raises input power and, ultimately, acoustic output.

The size of the piston diameter is sixteen inches. This is the largest known moving coil piston transducer known to the inventors. The advantages of the large diameter are related to the low frequency capability of the transducer and its adaptability to a twenty-one inch diameter torpedo hull towbody. The discussion of the towbody is unnecessary for understanding the present invention, but suffice to say that the sixteen inch dimension was arrived at by constraining the magnet diameter to twenty-one inches and employing the optimum piston size for the magnet.

It will be understood that various changes in the details, materials, steps and arrangement of parts, which have been herein described and illustrated in order to explain the nature of the invention, may be made by those skilled in the art within the principle and scope of the invention as expressed in the appended claims.

I claim:
1. An underwater electrodynamic transducer comprising:
   a magnetic circuit including a magnet having a central aperture, pole pieces located at both axial ends of said magnet and said pole pieces extending outward radially from said magnet, said magnet and pole pieces being arranged to form a magnetic air gap, said magnet, said central aperture, said pole pieces and said magnetic gap all being arranged so as to have a common axis;
   a moving coil rectangular in cross said magnetic air gaps, said rectangular coil having its long dimension perpendicular to the motion of said coil;
   a piston skirt holding said moving coil;
   a beryllium copper piston dome and a beryllium copper skirt spider connected to said piston skirt and holding said piston skirt and said conductor coil within said magnetic air gap;
   a flexible rubber seal connecting between an axial extension of said pole piece that is located outward radially from said magnet and said piston components for inhibiting seawater from entering said transducer;
   a centering shaft connected to said piston dome, said centering shaft having an aperture extending at least part way through the shaft, said centering shaft having said common axis and arranging said piston dome, said piston skirt and said coil to have said common axis;
   alignment means for restricting the motion of the shaft to a straight line along said common axis, said alignment means includes linear bearing affixed to said magnetic circuit by respective bearing holders and said skirt spider located between said piston skirt and said shaft;
   a spring assembly connecting said shaft to said magnetic circuit; and a housing piece connected to and extending from said magnetic circuit; said housing piece forming a chamber having an air mass and having said common axis and a portion of said housing piece being located radially outward of said spring assembly.

2. An underwater electrodynamic transducer according to claim 1 wherein said piston dome, said flexible rubber seal, selected pole pieces and said housing interconnect to form a watertight seal.

3. An underwater electrodynamic transducer according to claim 2 wherein said spring assembly further comprises:

a platform having a central aperture with said shaft extending into said aperture and connecting to said platform; and a plurality of springs connecting between said platform and said magnetic circuit.

4. A underwater electrodynamic transducer according to claim 3 wherein said coil is double layered.

5. An underwater electrodynamic transducer according to claim 4 further comprising leadwires extending through said shaft aperture and connecting to said coil.

6. An underwater electrodynamic transducer according to claim 5 further comprising a piston suspension system that includes said springs and said air mass in said chamber.

* * * * *